March 6, 1962
W. L. TENNEY ET AL
3,023,564
LAWN MOWER WITH RECIPROCATING CUTTER DRIVEN BY
A FREE PISTON INTERNAL COMBUSTION ENGINE
Filed Feb. 4, 1959
6 Sheets-Sheet 1
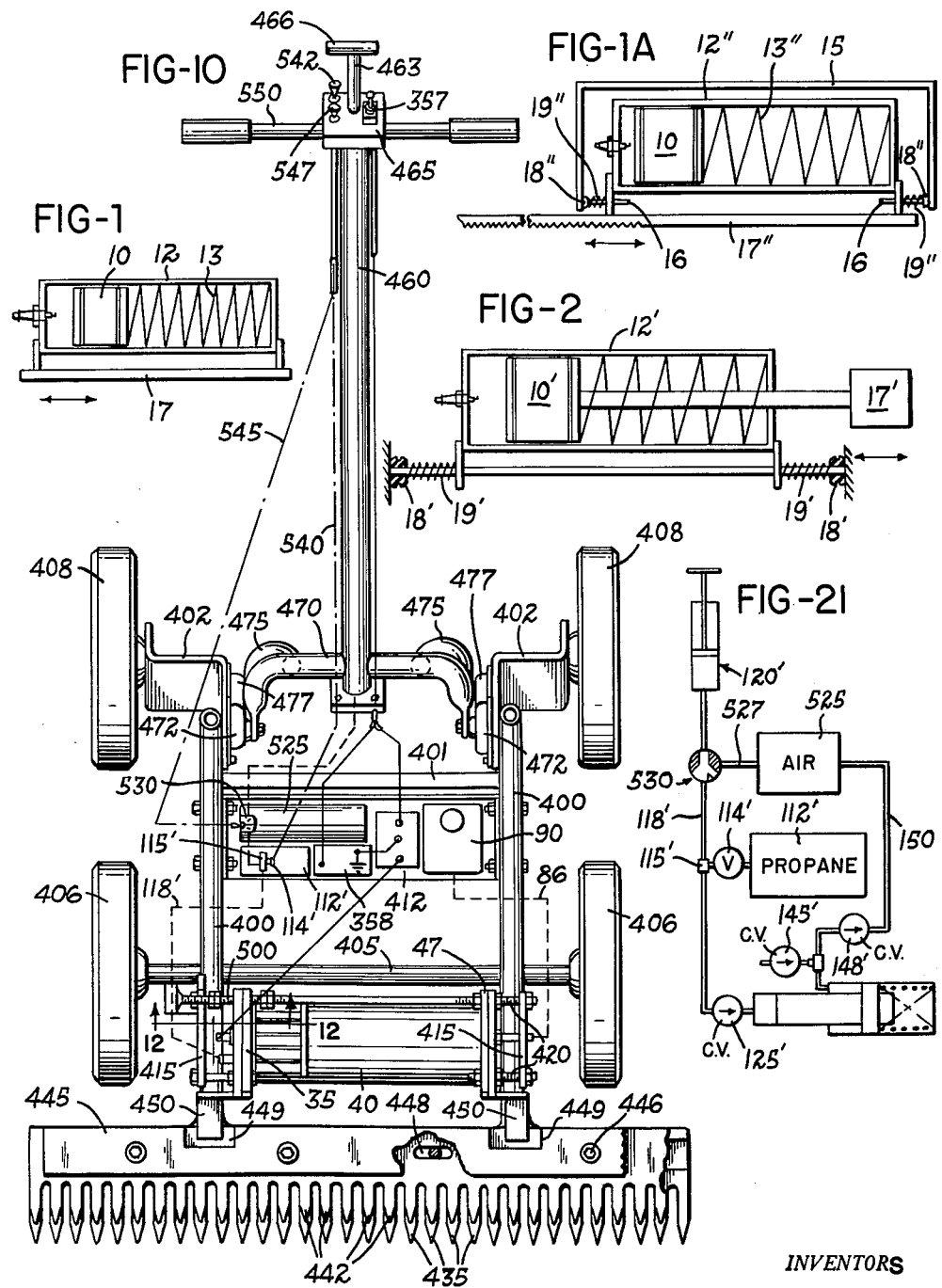
INVENTORS
WILLIAM L. TENNEY &
JOHN E. EASTMAN
BY
Marechal, Biebel, French & Bugg
ATTORNEYS

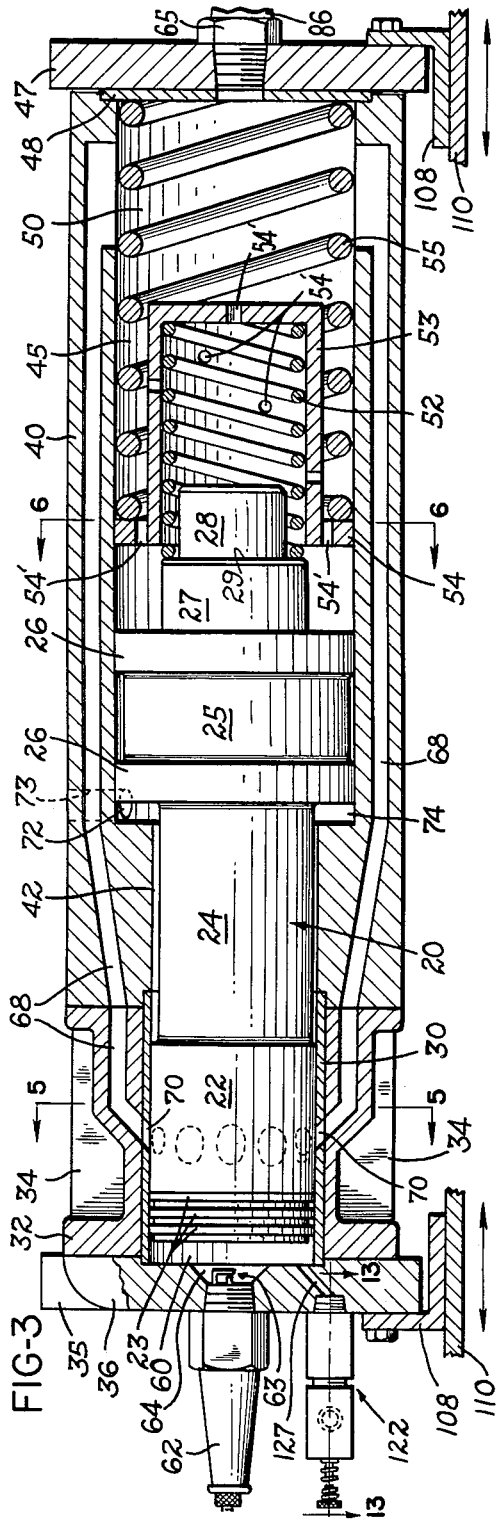
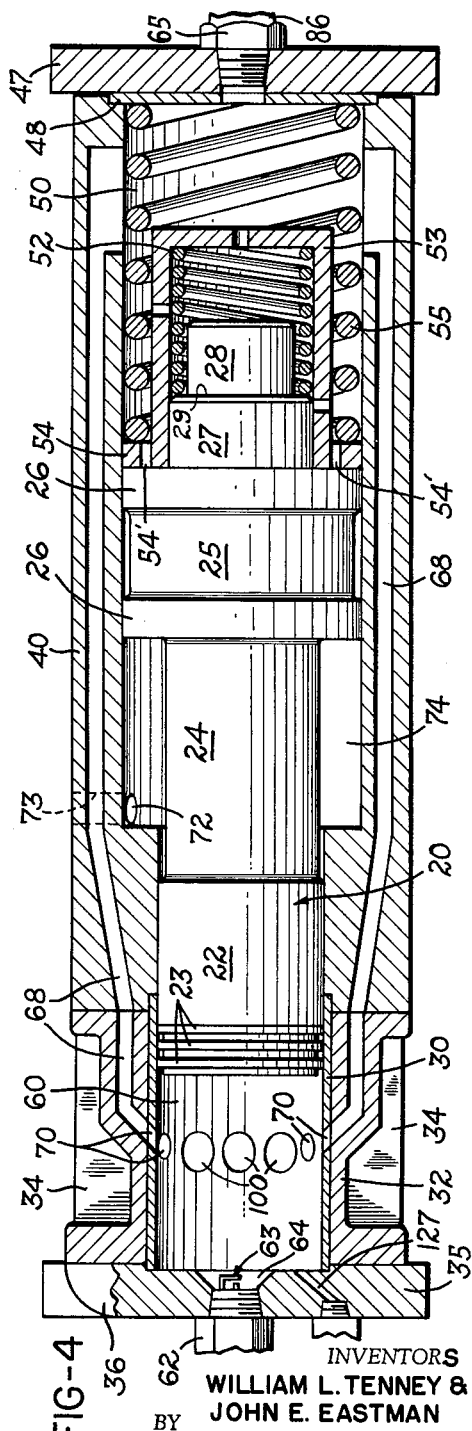

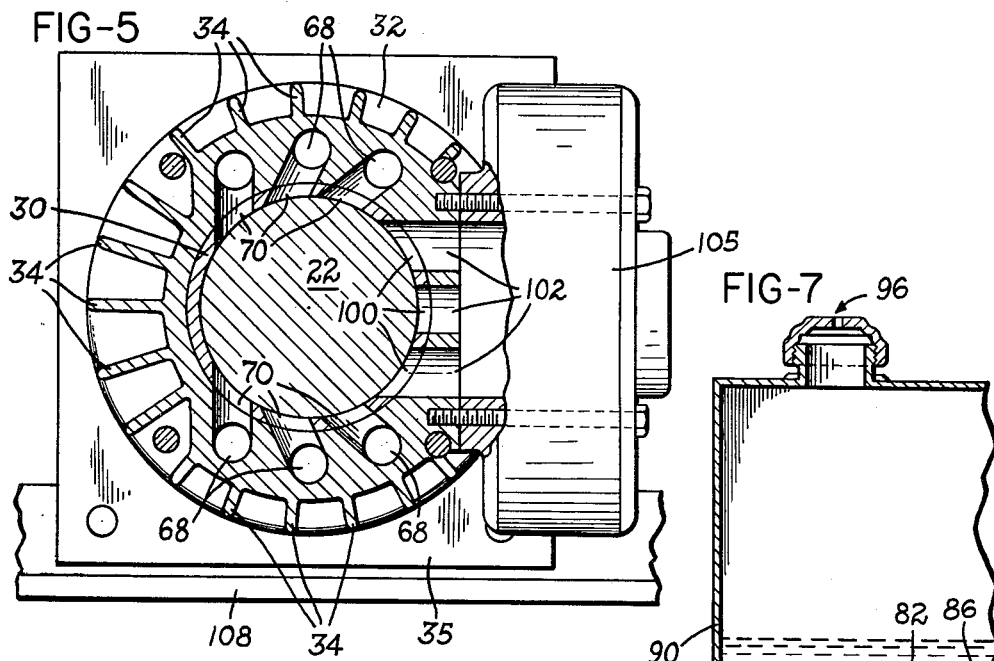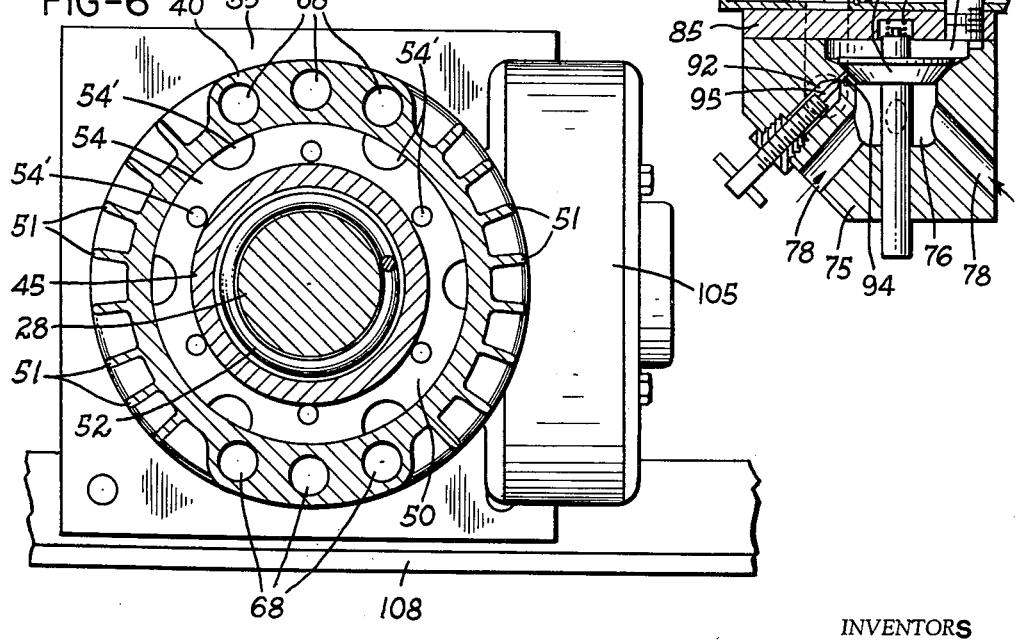

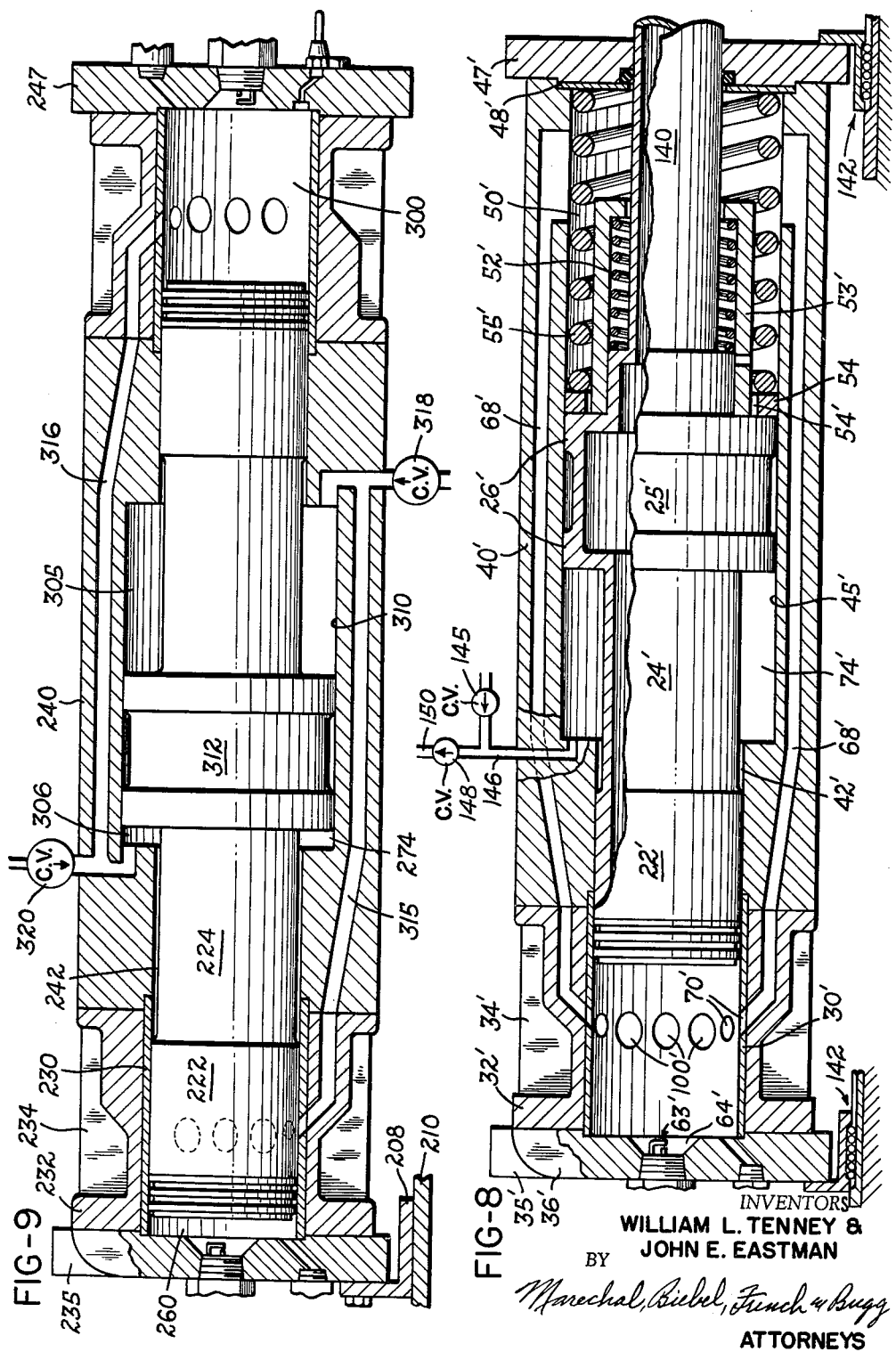

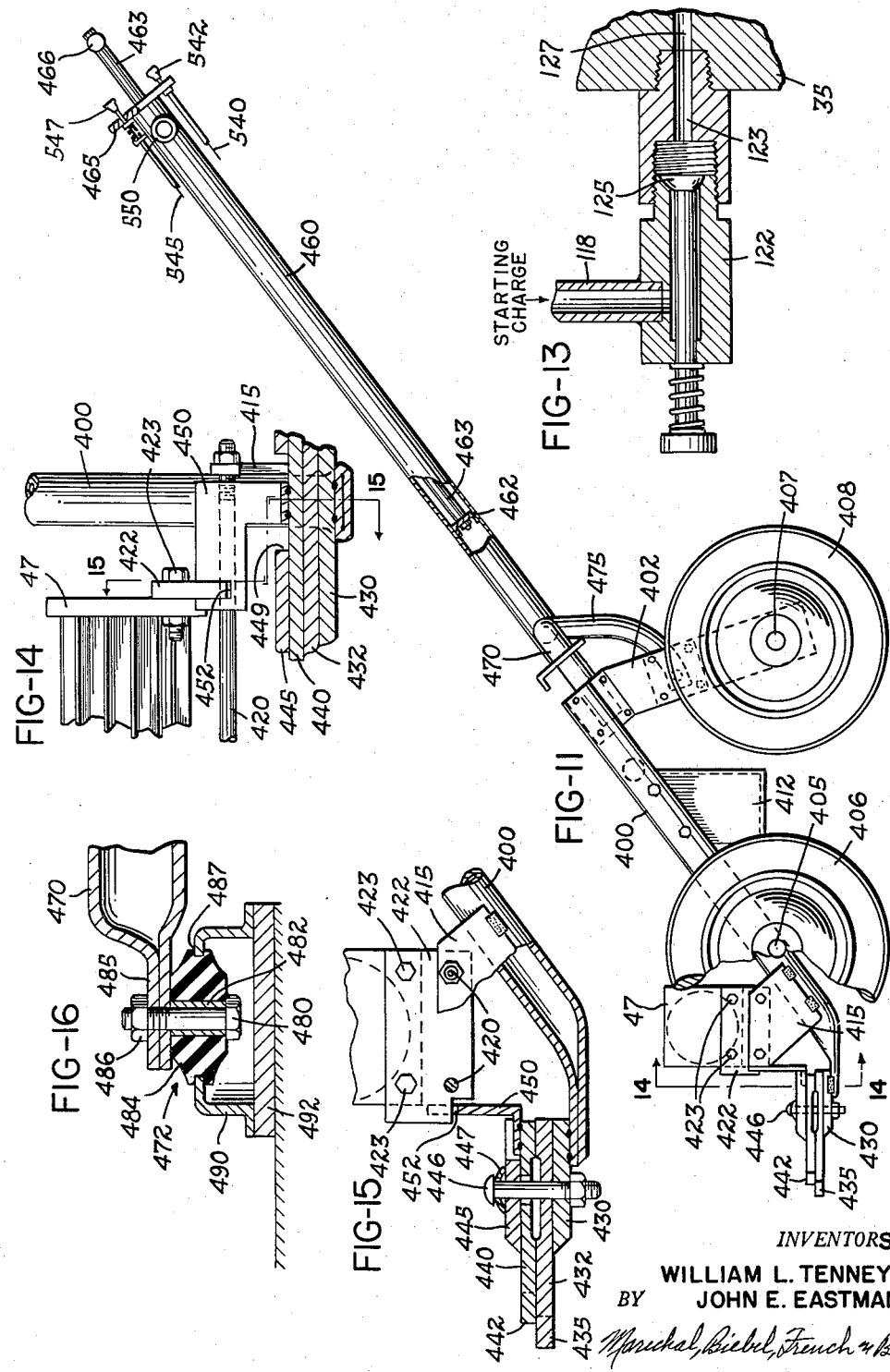

March 6, 1962    W. L. TENNEY ET AL    3,023,564
LAWN MOWER WITH RECIPROCATING CUTTER DRIVEN BY
A FREE PISTON INTERNAL COMBUSTION ENGINE
Filed Feb. 4, 1959    6 Sheets-Sheet 6
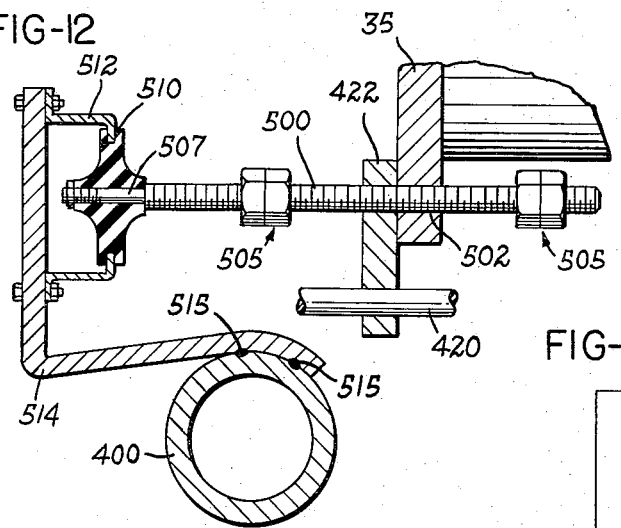
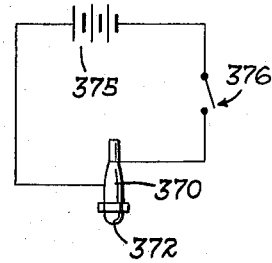
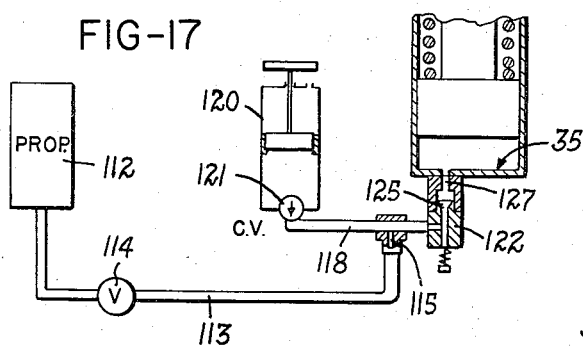
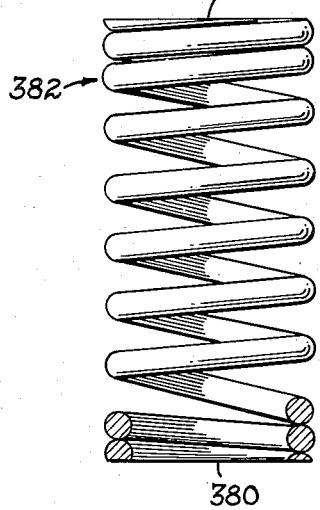
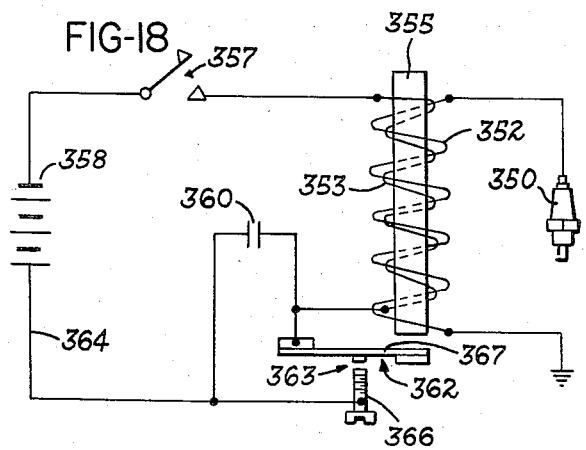
INVENTORS
WILLIAM L. TENNEY &
BY   JOHN E. EASTMAN
*Marshal, Biebel, French & Bugg*
ATTORNEYS

United States Patent Office 3,023,564
Patented Mar. 6, 1962

3,023,564
LAWN MOWER WITH RECIPROCATING CUTTER DRIVEN BY A FREE PISTON INTERNAL COMBUSTION ENGINE
William L. Tenney, Crystal Bay, Minn., and John E. Eastman, Minneapolis, Minn.; said Eastman assignor to said Tenney
Filed Feb. 4, 1959, Ser. No. 791,107
28 Claims. (Cl. 56—26.5)

This application relates to internal combustion engines, particularly such engines of the mass reaction type.

The present invention utilizes the reaction forces resulting from the inertial resistance of a solid reaction mass to obtain useful output from an internal combustion engine, particularly such engines constructed similarly to engines of the free piston type. Actually, both the piston and the cylinder members of the engine are free to move in space, within the confines of their respective mountings, in response to combustion of a charge in the power cylinder of the engine. One of these members is coupled directly to an output such that the output connection reciprocates with that member of the engine to which it is connected and applies useful power to a load. This power may be utilized to operate many different types of devices, typical examples being cutting devices wherein the reciprocating movement of the output-coupled member of the engine may be employed directly without amplification or transformation. The other freely movable member of the engine has substantial inertial resistance to movement and thus provides the solid reaction mass, preferably being constructed so as to be relatively heavy with reference to the output-coupled member.

The piston and cylinder members of the engine, in addition to defining the power cylinder, and while being freely movable within the confines of their mountings, are both arranged to act upon a yieldable or compressible biasing means which is capable of storing and returning energy imparted thereto by the piston member and/or the cylinder member. Thus, for example, with an engine of this type operating on a two-stroke cycle, combustion of a charge produces a "power" stroke and an effective delivery of power through the output-coupled member of the engine in one direction, and in addition energy is stored in the biasing means during this "power" stroke and returned to the system as energy utilized partially for producing a compression stroke, with the piston compressing a charge in the cylinder in the usual manner, while the remaining energy is transferred through the output-coupled member to the output, providing an effective power delivery in the opposite direction from the output power of the "power" stroke of the engine. Therefore, useful energy is delivered at the output as a reciprocating movement powered in both directions, and the biasing means performs a function similar to the function of a flywheel in the familiar type of internal combustion engine having a fixed cylinder and a reciprocating piston connected through a crank to a rotating crankshaft.

The yieldable or compressible biasing means is of sufficient strength to absorb and return substantially all energy imparted thereto from the piston member and/or the cylinder member in response to movement thereof by the force of combustion of a charge in the engine. Thus, the biasing means, which may preferably be in the form of a set of series-connected spring members which are progressively operatively engaged between the piston and cylinder members, will prevent impact between the piston and cylindrical members during the "power" stroke and the energy stored in the biasing means will be returned to the system partially to provide for compression of an additional charge in the power cylinder, and partially to be transmitted as useful power through the output-coupled member. Accordingly, no impact occurs between the piston and cylinder members under normal operating conditions and no wear or destructive action results from such a cause. Thus, force is applied to the output-coupled member in both directions, first by the combustion of the charge, and then by the power stored in the biasing means during the combustion or "power" stroke and returned subsequently to the system when the force of the combustion is dissipated.

The primary object of this invention is to provide a mass reaction internal combustion engine wherein output power is derived from the relative movement between a piston member and a cylinder member which movably react in opposite directions upon combustion of a charge in the engine.

Another object of this invention is to provide such an engine wherein the cylinder and piston define a power cylinder including a combustion chamber into which a combustible charge is supplied in timed relation to relative movement between the piston and the cylinder, wherein both the piston and the cylinder are mounted for free movement relative to each other, and wherein a compressible means is connected between the piston and the cylinder tending to oppose such relative movement therebetween, as results from combustion of a charge therein, for transferring energy between the piston and cylinder.

An additional object of this invention is to provide a reaction engine operating with a relatively heavy compact reaction mass as compared for example to an air jet reaction engine, and having a reciprocating output whereby power is removed from the engine through an output connection to one of two members reacting to intermittent combustion of fuel charges.

A further object of this invention is to provide such a reaction engine wherein the output connection is made directly to one of two members mounted for free movement relative to each other, and wherein the other member is normally free to move, within the confines of its mountings, relative to the one member having connection with the output.

Another object of this invention is to provide a novel method and apparatus for extracting mechanical power from "free piston" type engines.

A further object of the invention is to provide an internal combustion reaction engine in which the reaction mass is a solid, wherein the engine is inherently resistant to stalling regardless of how heavy a work load is imposed on it, and wherein there is an inherent adjustment in transmission of energy at the mechanical output in accordance with variable loading such that addition of load to the output may result in a shortening of the output stroke while at the same time the force exerted at the output will increase in relation to the decrease in the output movement.

A further object of the invention is to provide such an engine which is inherently easy to start, since one of the engine members which reacts to combustion is substantially unloaded and free to move with the engine at rest, and thus the engine may be considered as under a "no load" condition at the time of starting in spite of the direct coupling to a load of the output-coupled member.

Another object of the invention is to provide a reliable, low cost, easy to operate and relatively light-weight internal combustion engine of the reaction type having a reciprocating output.

Another object of the invention is to provide a novel internal combustion engine which is of essentially simple low cost construction and easy to maintain, having few moving parts and a simple direct coupling to a load, while retaining ease of starting and adaptability to accommodate changing load conditions within the limits of its design.

A further object of this invention is to provide clutching and variable power transmission functions inherent in the engine itself, without requirement for additional mechanical means normally used to accomplish these functions.

A further object of the invention is to provide improved starting apparatus, which is simple and reliable, for free piston and similar type engines such as disclosed herein.

An additional object of the invention is to provide a mass reaction engine having a novel construction for removing mechanical power therefrom which may be adapted to driving tools having reciprocating elements such as clipper bar-type lawn mowers, saws, and the like.

A further object of the invention is to provide an improved, simple and low cost clipper-bar type of mowing machine.

Another object of this invention is to provide a novel self-starting system for mowing machines and the like.

Other objects and advantages of the invention will be apparent from the following description, the accompanying drawings and the appended claims.

In the drawings:

FIGS. 1, 1A, and 2 are schematic representations of typical engine constructions in accordance with the invention;

FIG. 3 is a somewhat schematic vertical section through a one cylinder engine of a type shown generally in FIG. 1, showing the piston and cylinder in relative position wherein the intake and exhaust ports are closed and the engine may be considered at rest;

FIG. 4 is a view similar to FIG. 3 illustrating the parts after relative movement resulting from combustion has occurred;

FIG. 5 is an enlarged section taken on lines 5—5 of FIG. 3;

FIG. 6 is an enlarged section taken on lines 6—6 of FIG. 3;

FIG. 7 is a view, with parts broken away and shown in section, of a suitable fuel supply and air intake control valve which may be connected to the engine shown in FIGS. 3–6;

FIGS. 8 and 9, respectively, are vertical sectional views, with some parts broken away, of modified constructions of engines in accordance with the invention;

FIGS. 10 and 11 are top plan and side elevational views, respectively, of a clipper bar-type of lawn mower to which the engine shown in FIGS. 3–6 has been attached, illustrating a typical application of the engine;

FIG. 12 is a detail view on an enlarged scale, partially in section, taken on line 12—12 of FIG. 10, and showing a suitable buffer and guide structure for the engine on the lawn mower;

FIG. 13 is a section on an enlarged scale, taken on line 13—13 of FIG. 3, through the inlet for supplying starting pressure fluid to the engine combustion chamber;

FIG. 14 is an enlarged detail view, partly in section, taken on line 14—14 of FIG. 11, of the slidable mounting for the engine cylinder on the lawn mower frame;

FIG. 15 is a view taken on line 15—15 of FIG. 14;

FIG. 16 is a detail view in section through one of the shock mountings for the handle of the lawn mower;

FIG. 17 is a schematic diagram of a suitable starting system for the engine;

FIGS. 18 and 19 are schematic diagrams of suitable ignition systems which may be used with the engine;

FIG. 20 is a plan view of a main biasing spring which is particularly adaptable to the present invention; and FIG. 21 is a schematic diagram of a novel starting system which may be used on the mowing machine.

The present invention relates to internal combustion mass reaction engines. Basically, an engine in accordance with the invention comprises a piston member and a cylinder member cooperating to define a power cylinder including a combustion chamber into which a combustible charge is introduced in timed relation to relative movement between the piston and cylinder tending to compress a charge so supplied. The compression stroke basically is caused by a biasing means acting between the piston and cylinder in a direction tending to reduce the volume of the power cylinder, with this biasing means being of sufficient strength to reverse relative movement of the piston and cylinder resulting from combustion of a charge in the combustion chamber while preventing impact between the piston and cylinder members under normal operating conditions. The power output is in the nature of a reciprocating stroke provided by a direct connection to either the piston or the cylinder, with the other being substantially freely movable relative to the output connected member.

For example, referring to the schematic showing in FIG. 1, the piston 10 is mounted for free movement in space within the cylinder member 12, the free movement being confined of course in a direction axially of the cylinder member by the construction, and a biasing means in the form of a suitable spring 13 tends to oppose movement of these members resulting from combustion of a charge in the engine. The output connection is provided by an arm 17 bolted directly to cylinder member 12.

Operation of this basic configuration is as follows. As a combustible charge is introduced into the cylinder in timed relation to a compression stroke (assuming that the engine is operating) this charge will be compressed and upon combustion the piston member will tend to move in one direction and the cylinder member in the other. The piston member 10 provides a solid reaction mass which is resistant to movement by the combustion pressure by reason of its inertia, as well as the resistance offered by the spring biasing means. Thus, as the combustion gases expand and the cylinder and piston move relative to each other against the biasing means, the output member will follow with the cylinder member and as the energy of combustion is dissipated, the biasing means, being compressed, will reverse the relative movement of the piston and cylinder, while preventing impact between these members, and there will be a corresponding return movement of the output member. The energy stored during the "power" stroke of the engine, when the combustible charge is burned, will be returned from the spring biasing means as useful energy, a part of which is employed in producing relative movement between the cylinder and piston in the nature of a compression stroke, while the stored energy not so utilized in producing the compression stroke will be transferred through the cylinder member as useful power during such return movement.

The diagrammatic illustration of another engine in FIG. 2 represents the inverse relation of piston and cylinder members with respect to the output connection, with the cylinder member 12' being supported for free movement in space relative to the piston member 10' which in turn is connected directly to the output member 17'. During operation of this configuration the cylinder member provides the solid reaction mass and the output, as shown in the drawings, is obtained from movement of the piston member.

As previously mentioned, the reaction mass member is substantially free to move within the confines of its mounting. Thus, for purposes of centering, register, or the like, the mountings for cylinder member 12' may include rubber, or like, shock mounts or bumpers 18' and may include light springs 19'. For example, as the load applied at 17' is increased, the effective stroke of 10' will decrease and the effective stroke of 12' will increase. The springs 19' will tend to maintain centering and registry, and the bumpers 18' serve as a positive means of locating member 12' in case of some abnormal movement thereof such as might result from a misfire.

An exemplary construction of an engine in accordance with the invention is shown in FIGS. 3–7, wherein a piston member 20 having a piston head 22 carrying conventional compression sealing rings 23 is provided as an integral part of a neck portion 24 of reduced diameter which is in turn integral, or suitably connected, to a larger guiding piston part 25 having enlarged annular lands 26 thereon and rearwardly projecting head 27 terminating in a pilot portion 28 of reduced diameter, providing an annular seat 29 at the end of head 27. The piston head 22 is received within a cylinder liner or sleeve 30 which is in turn mounted in a cylinder body 32 having a plurality of suitable cooling fins 34 formed in the outer surface thereof (see FIG. 5), and having one end thereof closed by a cylinder head member 35 having cooling fins 36 which is bolted or otherwise secured in conventional manner across the end of cylinder body 32. It is possible and conventional according to well known engine designs to have the liner 30, cylinder 32, and cylinder head 35 formed as one integral part if desired.

Cylinder 32 is mounted upon an elongated preferably cylindrical body 40 having a smaller bore 42 which is of essentially the same internal diameter as the internal diameter of sleeve liner 30 to receive a portion of the piston head 22 during operation of the engine (see FIG. 4). The bore 42 opens into a further bore 45 of larger internal diameter and within which the guiding head 25 is received, with the lands 26 contacting the wall of bore 45 in guiding relation. The end of bore 45 is closed by head member 47 which is bolted or otherwise suitably secured to the body member 40, preferably retaining a hardened steel washer 48 therebetween, to provide an enclosed scavenging pump chamber 50 between the head member 47 and the enlarged guiding head 25 of the piston. The cylinder body 32 and the main body 40, being secured together, and with the heads 35 and 37 thereon, cooperate to form a cylinder member which corresponds to the cylinder member 12 as described in the schematic showing in FIG. 1. Of course, the body construction and the head for the scavenging pump chamber may be constructed as integral parts or the body could be formed integrally with the cylinder member 32. Also, the body 40 preferably includes suitable longitudinally extending cooling fins 51.

A biasing means is provided for urging relative movement of the piston and cylinder in such directions that the parts may be in position at rest as shown in FIG. 1. One suitable form of such biasing means includes the relatively weaker return spring 52 which seats at one end on the annular surface 29, and at its other end is received within a cup-shaped guide 53 including an enlarged lip or end portion 54 which has an outer diameter slightly less than the diameter of bore 45, serving to align the cup-shaped member 53 generally within the chamber 50. The cup-shaped guide includes holes 54' in the body and lip for passage of fluid therethrough which contributes to the scavenging pump action. A relatively stronger and relatively high rate return spring 55 is positioned between the lip 54 of cup member 53 and the head 47. Thus, these springs together with the cup-shaped part 53 tend to bias the piston and cylinder into the relative position shown in FIG. 3.

Further, the cup serves as a centering guide for spring 52, and prevents bottoming of that spring, and also to transmit force between these springs to reduce the shock load on spring 55 during a power stroke. Together these springs or an equivalent biasing means should be of sufficient strength to transmit energy between the cylinder member and the piston member without impact therebetween during normal running conditions of the engine. The arrangement is such that spring 52 functions more as a positioning device to bias the piston toward the cylinder head 35, and to resist initial movement of the piston reacting to combustion, while the spring 55 is positioned and dimensioned to exert its biasing force essentially after relative movement of the piston and cylinder members has uncovered the ports.

Obviously, the mounting of the spring members could be reversed, with the spring 55 contacting the piston member and the cup member 53, and with the weaker return spring 52 contacting the cup member 53 and the head 47 of the scavenging pump chamber. The function of such a reversed mounting of the springs is substantially as above described.

As will be noted from the drawing, the piston 22, cylinder liner 30, and cylinder head 35 cooperate to define a power cylinder including a combustion chamber 60, and a suitable charge igniting member such as a spark plug 62 is mounted in cylinder head 35, having electrodes 63 supported within a recess 64 in the cylinder head which is in communication with the combustion chamber.

A combustible charge is supplied to the combustion chamber through an inlet 65 providing a passage through the head member 47 into scavenging pump chamber 50, and from there the combustible fluid mixture is supplied through registering passages 68 in the walls of the main body 40 and cylinder 32 to inlet ports 70 in the cylinder liner 30.

The forward land 26 cooperates with the larger bore 45 to define a chamber which surrounds the neck portion 24 of the piston member, and a port 72 opens through the wall of the bore 45 and is connected through passage 73 to the exterior of the main body 40. As will be noted from comparison of FIGS. 3 and 4 air is pumped via passage 73 in and out of the chamber designated generally at 74. This action will serve to circulate cooling air around the neck 24 of the piston member and further cool the parts of the engine, particularly the piston member, during operation. In action the air is expelled from port 72 in the form of a jet of relatively high velocity, and this jet may be directed to perform some auxiliary function such as blowing away cuttings or the like.

The combustible fluid mixture may be supplied to chamber 50 from a suitable charge supply device shown generally in FIG. 7. This device includes a body 75 having an internal cavity 76 which is connected through passages 78 to the atmosphere for supplying air. A reciprocable air intake check valve member 80 is seated within cavity 76 under the bias of a light spring 82 so as to close off the cavity 76 from an upper chamber 84 which is defined by the upper end of valve member 80 and a cover 85 for the body 75. An outlet tube 86 extends through cover 85 to communicate with chamber 84, and this tube 86 in turn is connected to the fitting 65 on the head member 47 of the engine. Preferably, tube 86 is made of flexible material such that there can be substantial relative movement between the engine and the charge supply device.

Fuel may be supplied from a tank 90 mounted on cover 85, and having a relatively large connecting passage 92 communicating through a restricted outlet 94, at the seat of valve member 80, with the air passage to the engine. The cross section of orifice 94 may be controlled through means of an adjustable valve 95, as shown in FIG. 7. Fuel flows by gravity from the fuel tank to orifice 94, and is prevented from flowing further by valve member 80 whenever that valve is seated by its spring 82. The large passage 92 provides for dispersion of any air bubbles therein into the tank, and out through the usual tank vent 96.

Assuming that the engine has been started, combustion of the compressed charge in combustion chamber 60 will produce relative movement between the piston member and the cylinder member such as to expand the volume of the power cylinder, and the relative movement between cylinder 32 and piston head 22 will cause the exhaust ports 100 to be uncovered, exhausting the burned charge through these ports and exhaust passages 102 (FIG. 5) in the walls of cylinder 32 into a suitable muffler indicated generally at 105. It will be noted that the exhaust ports 100 extend closer to the head 35 than inlet ports 70, and therefore these exhaust ports are uncovered first as the piston and cylinder move relative to each other, thereby providing for commencing of the flow of burned products of combustion out of the cylinder before the inlet ports are uncovered.

As combustion occurs and the piston and cylinder move in such relative directions of a power stroke the volume of the scavenging pump chamber 50 is in turn decreased, and since the check valve 80 will close against reverse flow through tube 86, the charge of combustible mixture in chamber 50 is precompressed and passes through passages 68 and through the inlet ports 70, scavenging the cylinder as in conventional two-cycle practice. The scavenging system shown is of the well known "reverse flow" or "loop" type wherein the incoming charge is directed toward the cylinder wall on the opposite side from exhaust ports 100, and also toward the cylinder head 35.

The entire engine as described above, is mounted for free movement in a direction axially of the cylinder and body 40. Such a mounting may be provided by connecting the cylinder head 35 and head member 47 to brackets 108 which are in turn secured to a suitable output member 110, shown schematically in FIG. 3, which is supported in any suitable manner for reciprocating movement parallel to the axis of the cylinder member. Thus, as the engine operates and the masses of the cylinder member and piston member react in opposite directions to combustion in the combustion chamber 60, the output member will follow the cylinder member (in the illustrated example) while the piston member will react against the biasing means to store energy therein for the following compression stroke; then as the piston returns under influence of the spring a compression stroke will result from opposite relative movement between the piston and cylinder members.

It will be obvious to those skilled in the art that as this cycle of operations continues additional charges will be drawn into the scavenging pump chamber 50 and fed to the power cylinder through passages 68 in timed relation to relative movement between the piston and cylinder members, and that burned gases will be exhausted from the power cylinder as the exhaust ports 100 are uncovered during travel of these members against the biasing force of the compressible means, illustrated as the springs 52 and 55.

Power is extracted from the engine by the direct connection between the mounting brackets 108 and the output member 110 which may be suitably mounted for reciprocating movement. Obviously, the reaction of the cylinder member (which in this embodiment is connected directly to the output or load through member 110) to the combustion will produce movement of the cylinder member in one direction, and the energy stored in the spring members or biasing means will produce a powered movement of the cylinder member in the opposite direction after the energy of combustion has been dissipated. The result therefore is a reciprocating movement of the output member which may be coupled to drive any suitable element in which reciprocating movement is desired, as for example, a saw blade or a reciprocating cutter bar of a clipper type mowing machine.

It has been found that the amplitude of the output movement will vary between no load and relatively heavy load, but conversely the force exerted through each stroke of lesser amplitude will be increased in relation to the decrease in length of stroke. Thus in this sense the present engine provides an automatic "variable transmission" of output according to conditions of load, with the force increasing as load increases, within the limits of the engine design.

As the travel of the output connected member is restricted, by adding load, the effective stroke of the free or mass reaction member relative to a fixed point in space will tend to increase, thus maintaining adequate uncovering of the inlet and exhaust ports and provide non-stalling characteristics of the engine under load. Therefore clutches or similar releasable connections between the engine and the load may be eliminated.

The schematic showing of FIG. 1A is illustrative of a typical application of the engine and drive in accordance with the invention. Here, the basic engine configuration of FIG. 1 is shown incorporated in a portable saw, having a lightweight frame and carrying handle 15 within which the cylinder member 12" is freely mounted for reciprocation on mounting rods 16. The limits of free movement of the cylinder member are defined by bumpers 18" and spring 19", and the load member reciprocating with the cylinder is a conventional saw blade 17" which preferably extends well beyond one end of frame or handle 15.

The above described construction corresponds to an actual operating engine which was constructed in accordance with the teachings of the invention and which had the following approximate dimensions:

| | Inches |
|---|---|
| Power cylinder bore | 1¾ |
| Distance from head to edge of exhaust port | 0.968 |
| Head to edge of intake ports | 1.0625 |
| Power piston length | 3¾ |
| Scavenging cylinder bore | 2½ |
| Overall length of piston member | 4 |
| Overall length of body | 7½ |

Other successful engines have been constructed with the following bores:

| | Inches |
|---|---|
| Power cylinder bore | 2½ |
| Power cylinder bore | 1¾ |
| Power cylinder bore | 1¼ |
| Power cylinder bore | 1¼ |
| Scavenging pump | 2½ |
| Scavenging pump | 2 |
| Scavenging pump | 1¼ |
| Scavenging pump | 1¾ |

The foregoing description is directed to typical constructions of an engine of the present invention operating on a two-stroke cycle and employing a direct acting scavenging pump and carburetor for fuel supply. It will be obvious to those skilled in the art that either 2-cycle or 4-cycle engines may be constructed in accordance with the invention operating on either the Otto, or on a combination cycle, and with suitable fuel supply apparatus, either carburetor or fuel injector systems, as may be desired. The ignition systems may incorporate well known spark plug or glow plug apparatus and circuits, hot point ignition, or equivalent ignition apparatus. Other modifications will suggest themselves to those skilled in the internal combustion engine art.

The invention also includes a novel method and means of starting engines of this type by producing an initial relative movement of the piston and the cylinder against the biasing means, by introduction of a pressure fluid into the combustion chamber, to uncover the inlet ports 70 and also to store sufficient energy in the biasing means for producing a compression stroke, and also to introduce a vaporized starting fuel into the combustion chamber. The drawings disclose two slightly different arrangements of apparatus for this purpose, but they will be described together since the operation of each system is essential the same.

Accordingly, referring to FIGS. 3, 13 and 17, a quantity of starting fuel, preferably vaporized fuel such as propane gas is supplied from a tank 112 via tube 113, and the flow to this tube is controlled by a suitable valve 114. The starting fuel supply is then connected through a relatively small metering orifice 115 opening directly into an air supply line 118.

Starting air under pressure is supplied from a suitable source such as the hand pump 120 (FIG. 17) which discharges through check valve 121 and past orifice 115 into a housing 122 which contains a spring closed poppet type check valve 125. In FIG. 3 this housing is shown mounted directly on the cylinder head 35 and opening into a passage 127 which directs the starting charge under pressure into the combustion chamber.

In starting, the fuel valve 114 is opened for a time sufficient to fill the tube 113 with vaporized starting fuel which will be under some pressure, and the pump 120 is manipulated to supply compressed air to the valve block and thence to the combustion chamber. The starting fuel is thus mixed with air before supply to the combustion chamber. The relatively small metering orifice 115 provides sufficient restriction to flow of starting fuel from tube 113 to meter fuel into the air and produce a combustible mixture and to continue the supply of starting fuel for a number of starting strokes of the engine, since the line or tube 113 is of sufficient length to act as a fuel reservoir. This assures that the engine is kept operating until the normal charge supply system, through the scavenging pump and inlet ports 70, is supplying fuel to the engine. At the same time, pressure due to combustion within the engine will close poppet valve 125 and prevent loss of combustion pressure, clogging of restriction 115 due to carbon deposit, or the like.

Since the starting charge is under pressure when supplied to the combustion chamber, and since relative movement of the piston and cylinder members is resisted only by the relatively light or weak spring 52 when the piston is at "top dead center," the starting charge of compressed air and vaporized fuel will produce an initial relative movement between the piston and cylinder members against the biasing means. Furthermore, as the resultant combustible starting charge is ignited an initial power stroke will result and sufficient energy will be transmitted to the biasing means to provide for return of the piston and cylinder members toward their initial position (FIG. 3) producing an initial compression stroke. As the next charge is ignited the cycle will repeat (in the case of the described two cycle engine) and the engine will then continue to operate with further charges being supplied through the normal supply system.

The orifice 115 provides proper metering of the vaporized fuel to supply a correct fuel-air mixture to the engine for starting. The length of tube 113 between this orifice and valve 114 is sufficient to maintain a supply of starting fuel during several starting strokes of the engine to insure proper starting before the supply of starting fuel in line 113 is exhausted.

The length of output stroke, force of stroke, and manner of transformation of energy obtained from an engine constructed according to this invention may be controlled to some extent in design by controlling the relationship of the mass of the moving cylinder member to the mass of the moving piston member. Basically, the greater the mass of one of these members the greater its inertia, and accordingly, the greater the force necessary to accelerate that member. Accordingly with the engine unloaded, if there is an unbalance of the two masses, then the absolute movement of these masses due to combustion of a charge in the combustion chamber will be related inversely to the ratio of these masses, with the part of less mass moving the greater distance.

Conversely, since in some designs the construction of the piston may lend itself more readily to lightweight construction, the piston may be relatively light in weight and the cylinder member proportionately much heavier, although still mounted for free reciprocating movement. In such cases, then, the output member 140 to the load may be connected directly to the piston member, as shown for example in FIG. 8, where like reference numerals with primes added have been applied to parts similar to those designated in FIGS. 3–6. The cylinder member is, in this configuration, mounted for free movement in an axial direction, for example on rollers 142, and the piston member and output member 140 are hollow to reduce their collective weight. Such an engine operates according to the same principles as outlined above.

The engine shown in FIG. 8 also incorporates a suitable air compressor construction in place of the internal air cooling arrangement described in connection with the configuration shown in FIG. 3. Thus the chamber 74', defined by the enlarged bore 45' and the central land 25' of the piston member, provides a pumping chamber which may draw in air through a check valve 145 from the atmosphere through the connecting passage 146 on the power stroke (due to combustion) of the engine. On the compression stroke of the engine air is then pumped out of passage 146, through an outlet check valve 148 to an outlet passage or pipe 150 which may be directed to any suitable tank or other place of storage or use. It will be understood that it is good design practice to keep the volume of the connecting passage 146 to a minimum, and thus to keep the clearance volume of the compressor construction to a minimum for good efficiency.

Another modification of engine construction according to the invention is shown in FIG. 9, wherein like parts are designated by reference numbers in the 200 series, and wherein the biasing means constitutes a further combustion chamber 300 formed at the other end of the cylinder, in cooperation with an opposite end of the piston member. In such construction there may be provided separate scavenging pump characters 305 and 306 for each combustion chamber, these chambers being defined by an enlarged central portion 310 of the cylinder member within which reciprocates a correspondingly enlarged land 312 connected to the piston member. The pump chambers are connected through suitable charge supply passages 315 and 316, respectively, to the associated combustion chambers 260 and 300, and to a suitable charge supply device, for example a carburetor (not shown), through conventional check valves 318 and 320, respectively. Thus as a charge is being fed to one combustion chamber the charge in the other combustion chamber is being burned and a charge precompressed in its associated pumping chamber for supply thereto on the following stroke of the piston member.

Here each of the combustion chambers and scavenging pump chambers on one side of the engine provides a biasing means, due to the compression of gas therein, for the combustion and scavenging chambers on the other side, and of course further biasing force is obtained from the force of combustion in the combustion chamber on the opposite side. In a double-acting free piston engine of this type the power output may be through a direct connection with the reciprocating cylinder, with a suitable mounting for the cylinder member providing for reciprocating movement thereof along its axis, and with the piston member being freely reciprocable in the cylinder members.

Referring to FIG. 18, a suitable spark ignition system for the engines above described includes a spark plug 350 connected across the secondary winding 352 of an induction coil which also includes a primary winding 353 and a core 355. One end of the primary winding 353 is connected through a control switch 357 to a battery 358, while the other end of winding 353 is connected to a parallel circuit which includes a condenser 360 in one branch and a vibrator 362 having breaker contacts 363 in the other branch. The other side of this parallel circuit is connected through line 364 to the opposite terminal of battery 358. Preferably, the stationary one of the contacts 363 is mounted on an adjusting screw 366 for varying the gap between the contacts.

Operation of this type of an ignition system is well known, with the arm 362 being vibrated by attraction to the core 355 when a circuit is completed through the primary winding, this serving to break the primary circuit and to induce a sharp pulse in the secondary winding and across spark plug 350. At the same time, the spring arm 367 is released, returning the contacts into engagement. Practical experience has shown that a timed spark is not necessary to satisfactory operation of the engine, and that the above described system is satisfactory. However, if a timed spark is desired it can be provided by known means.

If desired, a simple glow plug circuit such as shown in FIG. 19 also may be used, wherein a glow plug 370 including a glow wire 372 is used in place of the spark plug, and the wire is brought to incandescent temperature by imposing an electrical potential thereacross from battery 375, with the circuit being controlled by a switch 376.

Of course, other suitable known types of ignition may be used. For example, it is possible to provide a "hot spot" in the combustion chamber which will become incandescent from the heat of combustion and retain sufficient heat to remain incandescent and ignite a charge during the following cycle of operation. Such a technique is well known in the internal combustion engine art. Also, it is possible with a suitable type of glow plug, as mentioned above, to disconnect the electrical circuit to the glow plug once the engine is running, and to have the glow wire 372 remain incandescent and function as the aforementioed "hot spot."

FIG. 20 shows a preferred construction of the main biasing spring, wherein the opposite ends 380 are ground flat, and wherein at one end of the spring there is a modified or wave dampening coil 382 having less space between coils than the remainder of the coils in the spring. The construction of springs of this type is well known in that art, and forms no part of the present invention. However, actual experience has shown that a spring as illustrated may provide optimum results in engines constructed according to the present invention.

FIGS. 10-12 and 14-16 disclose a typical application of an engine such as described in the foregoing parts of this specification, wherein the reciprocating output of the mass reaction engine is coupled directly to the cutter bar of a clipper type mowing machine. The machine includes main side frame members 400 connected by a cross member 401, and having downwardly extending legs 402 secured to the rearward ends thereof providing inverted V-shaped side members as shown in FIG. 11. A forward axle 405 extends through the foremost lower ends of frame members 400 and carriers front wheels 406 at its outer ends. Similarly, a rear axle 407 extends between the lower ends of legs 402 and supports rear wheels 408 at the outward ends thereof. Any suitable means to adjust the axles with respect to the frame can be provided to adjust the cutting height. A cross-bracket or shelf 412, of generally L-shape in side elevation as shown in FIG. 11, is secured between the frame members 400 providing support for auxiliary apparatus such as the battery, control valves, starting fuel tank, the fuel supply and carburetor, and similar parts not directly carried on the engine.

At the forward end of frame members 400 there are fixed upwardly extending brackets 415 which carry a pair of guide rods 420 therebetween. Mounting plates 422 are slidably received on rods 420, and include suitable mounting bolts 423 (FIGS. 14 and 15) which may be secured to the head members 35 and 47 of the engine, thus providing a free suport for reciprocation of the engine in a direction parallel to its longitudinal axis.

The lower ends of frame members 400 are suitably flattened and secured, as by welding, to a lower stationary mounting plate or bar 430 upon which is supported a stationary cutter bar 432 having a plurality of forwardly extending cutter teeth 435 which function in normal manner to guide the grass or other material being mowed rearwardly into the cutters. On top of stationary cutter bar 432 is a slidably supported cutter bar 440 having shorter forwardly projecting teeth 442 above each of the stationary teeth 435, and cooperable therewith to provide cutting elements for shearing off grass or the like as these teeth move relative to each other. The stationary pressure plate 445 extends over movable cutter bar 440 and is positioned on the cutter bar assembly through Belleville type springs 447. The movable cutter bar 440 is provided with slots 448 (FIG. 10) through which bolts 446 extend, defining the direction of relative movement between the movable and stationary cutter bars.

The rearward edge of the upper pressure plate 445 includes a pair of elongated notches 449 which are generally aligned with the side frame members 400, as shown in FIG. 10. Connecting brackets 450 are secured as by welding to the movable cutter bar 440 centrally of these notches, and extend upwardly to the elevation of the support rods 420 and then inwardly to the mounting plates 422. Bracket 450 includes slots 452 within which the forward ends of plates 422 are received, providing a drive conection therebetween. This construction affords a semi-flexible connection between the engine and cutter bar 440, so that engine movements which might not be in precise alignment with movement of the cutter bar will not be transferred to the cutter bar and disturb its cutting functions.

Thus, reciprocating movement of the engine cylinder member produces corresponding reciprocation of movable cutter bar 440. This particular construction of connecting brackets 450 aligns the vertical parts thereof with the frame member 400, thus reducing to a minimum the area of interference of parts extending upwardly behind the cutters, and facilitating the flow of cuttings over the cutter bars.

The handle structure for the mowing machine includes a hollow handle bar 460 which also may provide the cylinder of a manually operable air pump, there being a piston cup 462 received in the handle and connected to an elongated rod 463 which projects upwardly through the mounting plate 465 at the top of handle cylinder 460, having a grip 466 at the upper end thereof. This structure may provide the starting air pump 120.

The only vibration ordinarily transmitted to the frame of the mower will be that due to resistance to relative movement in the motor mounts and between the stationary and moving cutter bars. However, the handle cross bar 470 extends from the lower end of handle 460 and may include conventional Lord shock mounts 472 at opposite ends thereof secured to the frame members 402 to provide isolation of the handle from vibration of the frame. Supporting arms 475 extend downwardly from the cross bar 470 and are secured at their lower ends to similar shock mountings 477. Details of one of these shock mountings are shown in FIG. 16, including a bolt 480 extending through a sleeve 482 which is mounted in a rubber bushing 484. This bolt extends through the flattened end 485 of the cross bar 470 (or of the appropriate arm 475) and is secured thereto by nut 486. The rubber bushing 484 includes a peripheral groove 487 which is engaged by the inwardly extending lip of a mounting cup 490, and this cup in turn is fixed to a mounting plate 492 which may be suitably secured to the frame member 402.

A suitable device is provided for maintaining the teeth of the moving and stationary cutter bars in proper register, as for example, in the event that the engine should misfire and the resultant movement in one direction might be greater than in the opposite direction. This mechanism is disclosed in detail in FIG. 12 as including a rod 500 threaded over substantially the entire surface and extending through suitable aligned holes 502 in the head of the engine and in the mounting plate 422. A pair of lock nuts 505 is provided on each side of the mounting bracket and head to define the limits between which the cylinder member of the engine can reciprocate. Rod 500 includes a reduced end 507 which is retained in the flexible shock absorbing member 510 of a suitable shock mount, for example a Lord shock mount as mentioned previously, having a mounting cup 512. This cup in turn is supported upon a bracket 514 which is secured, as by welding 515 to the side frame member 400 of the mowing machine.

The invention also includes a novel self-starting arrangement for engines of the type herein disclosed, which may be used particularly in mowing machines or the like as above described. Referring to FIG. 21, wherein parts similar to the starting system shown in 17 are designated with like reference numerals having a prime added, the engine embodies the compressor structure disclosed in connection with FIG. 8, and discharges through line 150 into an air reservoir or tank 525 through the check valve 148'. This tank in turn has an outlet line 527 leading to a two-way valve 530 which is connected, as shown, in the supply line 118' between hand pump 120' and the mixing T 115' through which starting fuel from tank 112' is added. Thus, by appropriate manipulation of valve 530 the line 527 from compressed air tank 525 may be connected to line 118' and used as a source of starting pressure fluid for supplying a combustible mixture to the engine. In the event that for some reason there is not sufficient pressure in tank 525, the valve 530 may be turned to the position illustrated for supply of compressed air from the hand pump 120'.

Valve 114' is normally closed, and may be remotely controlled by a spring biased operating cable 540 having a control knob 542 on the mounting plate 465, such that a momentary push on the knob will release a quantity of propane to the T 115'. Valve 530 is normally in the position shown in FIG. 21, and may be remotely actuated through a spring biased cable 545 having a knob 547 on plate 465. Thus, momentary actuation of cable 545 will release a quantity of compressed air from tank 525 into line 118'. Also, switch 357 may conveniently be mounted on plate 465, such that all the starting controls are centrally located adjacent the handle cross bar 550.

Accordingly, the present invention provides a novel internal combustion reaction engine which utilizes the reaction forces resulting from inertial resistance of a solid reaction mass to obtain useful power output. This engine preferably is similar to the type generally known in the art as "free piston" engines, but the power output is a mechanical reciprocating output, as distinguished from the power fluid output of conventional free piston engines. The engine construction in accordance with the invention requires few moving parts and therefore friction losses are minimized, and construction costs and reliability of operation are favorably improved. Furthermore, since the solid reaction mass is always supported for free movement in response to combustion of a charge, the engine inherently incorporates non-stalling characteristics, and is inherently capable of exchanging force for amplitude in its output. Thus, if the load resistance on the output of the engine increases, the amplitude of the reciprocating output stroke may decrease, but the force exerted during each output stroke will increase. Therefore, the invention inherently incorporates a type of "automatically infinitely variable power transmission."

Furthermore, the invention provides novel apparatus for starting internal combustion engines, particularly of the type herein disclosed, which assures starting under all types of conditions. The starting fuel charge supplied to the engine is vaporized, thus minimizing one of the difficulties in starting (particularly in two cycle engines) which may result from inadequate vaporization of fuel charges supplied during starting. As is well known, during cold starting with liquid fuel a rich (excess liquid) mixture is required due to the difficulty of obtaining proper vaporization, and "flooding" may result, with consequent inability to start the engine.

The novel mowing machine provided by the invention is inherently safer than, for instance, the rotary type of mowing machine which is known to throw rocks and debris in dangerous fashion. The reciprocating clipper bars operate through a comparatively short amplitude, and while having completely adequate cutting capabilities, they will not throw the cuttings or debris. The machines may be of lightweight construction, and minimum vibration is transmitted to the handle, and consequently to the operator, due to relatively free mounting of the reciprocating weights. Furthermore, a mowing machine incorporating the novel starting features disclosed herein is relatively easy to start and requires substantially no effort on the part of the operator, while at the same time not requiring any outside connections, as to a source of electricity or external starting mechanism.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. An internal combustion reaction engine for Otto cycle operation and the like comprising a cylinder member having a closed end, a piston member in said cylinder member cooperating with said closed end thereof to define a power cylinder including a combustion chamber, power output means on one of said members connectible directly to an output to provide for extraction of power from said engine, means supporting the other of said members for free movement in space relative to said one member in a direction axially of said cylinder member providing a solid reaction mass having inertial resistance to movement in response to combustion of a charge in said cylinder, yieldable biasing means acting on both said members in a direction to reduce the volume of said cylinder providing for relative movement therebetween in the nature of a compression stroke, said biasing means being of sufficient strength to absorb and return substantially all energy imparted thereto from said piston member and/or said cylinder member during each power stroke movement thereof providing an effective power delivery to said output means during the compression stroke, means to supply a combustible charge into said power cylinder in timed relation to relative movement between said cylinder member and said piston member, and ignition means for initiating combustion of charges in said combustion chamber.

2. An internal combustion reaction engine for Otto cycle operation and the like comprising a cylinder member having a closed end, a piston member reciprocable in said cylinder member and cooperating with said closed end thereof to define a power cylinder including a combustion chamber, means to supply a combustible charge into said power cylinder in timed relation to relative movement between said cylinder member and said piston member, means on said cylinder member connectible directly to an output to provide for extraction of power from said engine, means mounting said piston member for free movement relative to said cylinder member to provide a solid reaction mass freely movable in space and having a substantial mass inertia, yieldable biasing means acting on said members in a direction to reduce the volume of said power cylinder providing for relative movement therebetween in the nature of a compression stroke, said biasing means being of sufficient strength to absorb and return substantially all energy imparted thereto from said piston member and/or said cylinder member during each power stroke movement thereof resulting from combustion of a charge in said chamber providing an effective power delivery to said output means during the following stroke, and ignition means for initiating combustion of charges in said combustion chamber.

3. An internal combustion reaction engine for Otto cycle operation and the like comprising a cylinder member having a closed end, a piston member reciprocable in said cylinder member and cooperating with said closed end thereof to define a power cylinder including a combustion chamber, means to supply a combustible charge into said power cylinder in timed relation to relative movement between said cylinder member and said piston member, means on said piston member connectible directly to an output to provide for extraction of power from said engine, means mounting said cylinder member for free movement relative to said piston member to provide a solid reaction mass freely movable in space and having a substantial mass inertia, yieldable biasing means acting on said members in a direction to reduce the volume of said power cylinder providing for relative movement therebetween in the nature of a compression stroke, said biasing means being of sufficient strength to absorb and return substantially all energy imparted thereto from said piston member and/or said cylinder member during each power stroke movement thereof resulting from combustion of a charge in said chamber providing an effective power delivery to said output means during the following stroke, and ignition means for initiating combustion of charges in said combustion chamber.

4. A reaction engine for Otto cycle operation and the like having a reciprocating output, comprising a cylinder member having side walls and a closed end, a piston member in said cylinder member cooperating with said closed end thereof to define a variable volume power cylinder including a combustion chamber, means on one of said members providing a direct connection to an output, means mounting the other said member for free movement in space in a direction axially of said cylinder member providing a solid reaction mass having substantial inertial resistance to movement under the influence of combustion of a charge in said power cylinder, means defining ports formed through said walls of said cylinder member spaced from said closed end thereof and cooperable with said piston member to provide a charge inlet to supply a combustible charge to said power cylinder in timed relation to relative movement between said members and an exhaust passage for burned gases passing from said power cylinder, yieldable biasing means acting between said members in a direction to compress a combustible charge supplied thereto through said intake means, said biasing means being of sufficient strength to reverse the relative movement of said members resulting from combustion of a charge in said power cylinder while preventing impact between said members under normal operating conditions, and ignition means for initiating combustion of charges in said combustion chamber.

5. An internal combustion reaction engine for Otto cycle operation and the like having a reciprocating output, comprising a cylinder member having a closed end, a piston member in said cylinder member cooperating with said closed end thereof to define a power cylinder including a combustion chamber, means on one of said members providing a direct connection to an output, biasing means acting on said members in a direction to reduce the volume of said power cylinder to produce relative movement therebetween in the nature of a compression stroke, said biasing means being of sufficient strength to reverse the relative movement of said members resulting from combustion of a charge in said combustion chamber while preventing impact between said members under normal operation conditions, means connected into said power cylinder and constructed to supply a combustible charge thereto in timed relation to relative movement between said members, means mounting the other said member for free movement relative to said one member in a direction axially of said cylinder member, said freely mounted member having substantial inertial resistance to provide for development of an effective working stroke in said one of said members, and ignition means for initiating combustion of charges in said combustion chamber.

6. An internal combustion reaction engine for Otto cycle operation and the like comprising a cylinder member having a closed end, mounting means for said cylinder member providing for reciprocating movement thereof along the axis of said cylinder member, a piston member reciprocably mounted in said cylinder member and cooperating with said closed end thereof to define a power cylinder including a combustion chamber, an output member connected directly to one of said members, the other of said members being free to move along said axis of said cylinder member providing a solid reaction mass having substantial inertial resistance to movement by combustion of a charge in said power cylinder, biasing means acting on said members in a direction to reduce the volume of said power cylinder providing for relative movement therebetween in the nature of a compression stroke, said biasing means being of sufficient strength to reverse the relative movement of said members resulting from combustion of a charge in said power cylinder to provide an effective output stroke during said volume reducing movement while preventing impact between said members under normal operating conditions, means connected to supply a combustible charge into said power cylinder in timed relation to relative movement between said cylinder member and said piston member, and ignition means for initiating combustion of charges in said combustion chamber.

7. An internal combustion engine for Otto cycle operation and the like comprising a cylinder member having a closed end, a piston member reciprocable in said cylinder member and cooperating with said closed end thereof to define a power cylinder including a combustion chamber, biasing means operably connected between said piston member and said cylinder member and tending to oppose relative movement therebetween in a direction expanding said power cylinder, means defining a scavenging pump chamber receiving the end of said piston member opposite said power cylinder and cooperable therewith to pump fluid into said power cylinder, means connected between said pump chamber and said power cylinder to supply fluid from said pump chamber into said power cylinder in timed relation to relative movement between said cylinder member and said piston member, mounting means for said cylinder member providing for movement thereof in an axial direction, means on one of said members connectible directly to an output to provide for extraction of power from said engine resulting from relative movement between said cylinder member and said piston member in response to reaction therebetween upon combustion of a charge in said power cylinder, the other said member being freely movable in space in a direction axially of said cylinder member and having sufficient mass inertia to provide an effective output movement of said one member, and ignition means for initiating combustion of charges in said combustion chamber.

8. An internal combustion engine for Otto cycle operation and the like, said engine having a reciprocatory output comprising means forming a cylinder member, a piston having a substantial mass inertia and mounted in free reciprocating relation within said cylinder member cooperating therewith to define a power cylinder including a combustion chamber, means connected to said power cylinder for supplying a combustible fluid thereto, means mounting said cylinder member for movement along its longitudinal axis, means controlling said combustible fluid supply means to operate in timed relation to the relative movement between said piston and said cylinder member, ignition means for initiating combustion of charges in said combustion chamber, means operable between said piston and said cylinder member on the opposite side of said combustion chamber for storing sufficient energy resulting from relative movement of said piston and cylinder member in response to combustion of a charge to bias said cylinder member and piston in the opposite direction for compressing a charge passed to said power cylinder and also to provide an effective work stroke in said opposite direction, and power output means attached to said cylinder member and reciprocable therewith providing for direct extraction of power from said engine.

9. A reaction engine for Otto cycle operation and the like having a reciprocating output, comprising a cylinder member having a closed end, a piston member in said cylinder member cooperating with said closed end thereof to define a power cylinder including a combustion chamber, seal means between said members forming a substantially gas-tight seal providing for compression of gas supplied to said power cylinder, means on one of said members providing a direct connection to an output, biasing means acting on said members in a direction to reduce the volume of said power cylinder to produce relative movement therebetween in the nature of a compression stroke, said biasing means being of sufficient strength to transfer energy between said members without contact between said members during normal operating conditions, means connected into said power cylinder and constructed to supply a combustible charge thereto in timed relation to relative movement between said members, means mounting the other said member for free movement relative to said one member in a direction axially of said cylinder member providing a solid reaction mass having relatively great mass inertia for yieldable resistance to movement thereof by combustion of a charge in said chamber, and means for igniting a combustible charge compressed in said combustion chamber.

10. A two-cycle reaction engine having a reciprocating output, comprising a cylinder member having a closed end, a piston member reciprocably mounted in said cylinder member and cooperating with said closed end thereof to define a power cylinder including a combustion chamber, means on one of said members providing a direct connection to an output, biasing means acting between said members in a direction to reduce the volume of said power cylinder for producing relative movement therebetween in the nature of a compression stroke, said biasing means being of sufficient strength to transfer energy between said members resulting from reaction of said members to combustion of a charge in said chamber, means connected into said power cylinder for supplying a combustible charge thereto in timed relation to relative movement between said members, means mounting the other said member for movement relative to said one member in a direction axially of said cylinder member, and means connected into said power cylinder for initially supplying a quantity of compressed gas thereinto for producing relative movement between said members against said biasing means to start operation of said engine.

11. The method of obtaining mechanical power from an internal combustion engine of the free piston type operating on the Otto cycle, comprising mounting the cylinder of the engine for free movement in a direction parallel to the axis thereof in response to combustion of a charge in said engine, supplying combustible charges to said engine in timed relation to relative movement between the piston and cylinder thereof, igniting the combustible charges in said engine with an ignition means, coupling a load directly to one of the two moving parts of said engine for powered reciprocating movement with said one part, and supporting the other part of said engine for free movement in space providing a solid reaction mass having substantial inertial resistance to free movement thereof within the confines of its mounting.

12. The method of obtaining mechanical power from a free piston internal combustion engine operating on the Otto cycle comprising mounting the cylinder of the free piston engine for free movement in a direction parallel to the axis thereof in response to combustion of a charge in said engine, supplying combustible charges into the combustion chamber of said engine in timed relation to relative movement between the piston and cylinder thereof, igniting the combustible charges in said engine with an ignition means coupling a load directly to said cylinder for powered reciprocating movement therewith, and supporting the piston of said engine in freely reciprocable relation in said cylinder providing a solid reaction mass having substantial inertial resistance to free movement thereof in space within the confines of its mounting in the cylinder.

13. The method of obtaining mechanical power from an internal combustion engine operating on the Otto cycle comprising mounting the cylinder of the engine for free movement in a direction parallel to the axis thereof in response to combustion of a charge in said engine providing a solid reaction mass having substantial inertial resistance to free movement thereof within the confines of its mounting, supporting the piston of the engine for substantially free movement with respect to said cylinder in response to combustion of a charge in the engine, coupling a load directly to the piston of the engine for powered reciprocating movement therewith, supplying combustible charges to said engine in timed relation to relative movement between said piston and said cylinder, and igniting the combustible charges in said engine with an ignition means.

14. The method of obtaining power from an internal combustion engine operating on the Otto cycle, comprising the steps of defining a power cylinder including a combustion chamber by means of a piston member and cooperating cylinder member each mounted to provide for free movement thereof in a direction along the axis of the cylinder, biasing said piston and said cylinder in relative directions such as to reduce the volume of the power cylinder and produce a compression stroke, supplying combustible charges into said power cylinder in timed relation to the relative compression stroke movement of said piston and said cylinder, igniting the compressed charges in said combustion chamber with an ignition means to produce a force tending to expand the volume of said power cylinder against the bias on said piston and said cylinder, and connecting a load directly to one of said members for powered reciprocating movement therewith while maintaining the other member substantially free to move in response to the force of combustion of a charge such that the other member provides a solid reaction mass having inertial resistance to free movement thereof within the confines of its mounting.

15. An internal combustion engine of the character described adapted for Otto cycle operation and the like, comprising a cylinder member, a piston in said cylinder member, one end of said piston and the adjacent end of said cylinder member cooperating to define a power cylinder including a combustion chamber, biasing means normally urging said piston and said cylinder member in relative directions to reduce the volume of said chamber in the nature of a compression stroke, means for introducing and igniting combustible charges in said power cylinder to produce relative movement between said piston and said cylinder member in the nature of a power stroke expanding the volume of said power cylinder in opposition to said biasing means, ignition means for initiating combustion of charges in said combustion chamber, said biasing means including a first member exerting a relatively small biasing force against the other end of said piston and said cylinder member during an initial portion of each power stroke, and a second member operatively engageable between said piston and said cylinder member during the termination of each power stroke and arranged to exert a substantially large biasing force between the other end of said piston and said cylinder member sufficient to absorb substantially all energy transmitted thereto during each power stroke and to reverse the relative movement thereof and initiate a compression stroke while maintaining said other end of said piston spaced from said cylinder member during normal operation of said engine.

16. A mass reaction internal combustion engine of the character described adapted for Otto cycle operation and the like, comprising a cylinder member, a piston member in said cylinder member, one end of said piston member and the adjacent end of said cylinder member cooperating to define a power cylinder including a combustion chamber, means mounting both said piston member and said cylinder member for substantially free movement relative to a fixed point in space, an output connection on one of said members, the other said member providing a solid reaction mass having substantial inertial resistance to movement, biasing means normally urging said piston member and said cylinder member in relative directions to reduce the volume of said chamber in the nature of a compression stroke, means for introducing and igniting combustible charges in said power cylinder to produce relative movement between said piston member and said cylinder member in the nature of a power stroke expanding the volume of said power cylinder in opposition to said biasing means, said biasing means including a first member exerting a relatively small biasing force against the other end of said piston member and said cylinder member during an initial portion of each power stroke, and a second member operatively engageable between said piston member and said cylinder member during the termination of each power stroke and arranged to exert a substantially large biasing force between the other end of said piston member and said cylinder member sufficient to absorb substantially all energy transmitted thereto during each power stroke and to reverse the relative movement thereof and initiate a compression stroke while maintaining said other end of said piston member spaced from said cylinder member during normal operation of said engine.

17. An internal combustion engine of the character described adapted for Otto cycle operation and the like, comprising a cylinder member, a piston member in said cylinder member, one end of said piston member and the adjacent end of said cylinder member cooperating to define a power cylinder including a combustion chamber, means mounting both said piston member and said cylinder member for substantially free movement relative to a fixed point in space, an output connection on one of said members, the other said member providing a solid reaction mass having substantial inertial resistance to movement, differentially operable biasing spring means normally urging said piston member and said cylinder member in relative directions to reduce the volume of said power cylinder in the nature of a compression stroke, means for introducing and igniting combustible charges in said combustion chamber to produce relative movement between said piston member and said cylinder member in the nature of a power stroke expanding the volume of said power cylinder, said spring means including a first relatively weak spring supported to exert a relatively small biasing force between the end of said piston member and said cylinder member during an initial portion of each power stroke, and a second relatively strong spring operatively engageable between said piston member and said cylinder member during the termination of each power stroke to exert a substantially large biasing force between said piston member and said cylinder member sufficient to absorb substantially all energy transmitted thereto and to return such stored energy by reversing the relative movement of said piston member and said cylinder member providing a compression stroke while preventing impact between said other end of said piston member and said cylinder member during normal operation of said engine.

18. A reaction engine for Otto cycle operation and the like having a reciprocating output, comprising a cylinder member having a closed end, a piston member in said cylinder member cooperating with said closed end thereof to define a power cylinder including a combustion chamber, seal means between said members forming a substantially gas-tight seal providing for compression of gas supplied to said power cylinder, means on one of said members providing a direct connection to an output, biasing means acting on said members in a direction to reduce the volume of said power cylinder to produce relative movement therebetween in the nature of a compression stroke, said biasing means being of sufficient strength to transfer energy between said members without impact therebetween, means mounting the other said member for free movement relative to said one member in a direction axially of said cylinder member providing a solid reaction mass having substantial inertial resistance to movement, means defining a scavenging pump chamber receiving the end of said piston member opposite said combustion chamber and cooperative therewith to compress a combustible charge prior to supply thereof to said power cylinder, charge supply means connected to supply combustible charges to said pump chamber, ignition means for initiating combustion of charges in said combustion chamber, and transfer passage means connecting said pump chamber to said power cylinder for passing a combustible charge from said pump chamber to said power cylinder in timed relation to relative movement between said members.

19. A ported two-cycle internal combustion engine of the character described, comprising a cylinder member having a cylinder head at one end thereof, a piston member mounted for free movement in said cylinder member and cooperating therewith and with said head to define a power cylinder including a combustion chamber, charge inlet port means extending through the walls of said cylinder member in predetermined spaced relation axially thereof from said head, exhaust port means also extending through the walls of said cylinder member in spaced relation axially thereof from said head, means guiding said piston member for movement axially of said cylinder member to cover and uncover said port means and to travel substantially beyond said port means providing for exhaust of a burned charge from said power cylinder and for inlet of a fresh combustible charge into said power cylinder, ignition means for initiating combustion of charges in said combustion chamber the combustion of a charge in said chamber being operative to produce relative movement between said piston member and said cylinder member in the nature of a power stroke expanding the volume of said power cylinder and uncovering said ports, means mounting both said piston member and said cylinder member for substantially free movement relative to a fixed point in space, an output connection on one of said members, the other said member providing a solid reaction mass having substantial inertial resistance to movement, rebound biasing means normally urging said piston member and said cylinder member to reduce the volume of said power cylinder in the nature of a compression stroke, said biasing means including a first member exerting a relatively small biasing force in opposition to each power stroke, and a second member operatively engageable between said piston member and said cylinder member during the latter portion of the power stroke, said second member being of sufficient strength to absorb and return substantially all energy imparted thereto during each power stroke movement providing an effective power delivery in the direction of a compression stroke.

20. A mass reaction internal combustion engine of the character described for Otto cycle operation and the like, comprising a cylinder member, a piston member in said cylinder member, one end of said piston member and the adjacent end of said cylinder member cooperating to define a power cylinder including a combustion chamber, means mounting both said piston member and said cylinder member for substantially free movement relative to a fixed point in space in a direction parallel to the axis of said cylinder member, an output connection on one of said members, the other said member providing a solid reaction mass having substantial inertial resistance to movement, a relatively weak spring and a relatively strong spring arranged serially to operate as a biasing means between the other end of said piston member and said cylinder member in a direction to oppose movement thereof in response to combustion of a charge in said engine, a cup member between said springs including an outward flange engaging one of said springs and an inner cup portion engaging an end of the other spring providing for extension of said springs in coaxially overlapping relation to each other and operating to transmit force therebetween, said relatively strong spring having sufficient capacity to absorb substantially all energy transmitted thereto and to return such stored energy by reversing the relative movement of said piston member and said cylinder member providing an effective output stroke at said output connection in the opposite direction from an output stroke derived from combustion of a charge in the engine.

21. A reciprocating cutting machine comprising a frame, a cutter member mounted on said frame for reciprocating movement relative thereto, an internal combustion reaction engine for reciprocating said cutter including a cylinder member and a piston member in said cylinder member cooperating to define a power cylinder including a combustion chamber, mounting means on said frame supporting said cylinder member for reciprocating movement along its axis, means on one of said members connected directly to said cutter providing for reciprocating movement of said cutter along with said one member, means supporting the other said member on said frame for free movement in space relative to said one member providing a solid reaction mass having substantial inertial resistance to movement in response to combustion of a charge in said power cylinder, biasing means acting on said members in a direction to reduce the volume of said power cylinder in the nature of a compression stroke, said biasing means being of sufficient strength to absorb and return substantially all energy transmitted thereto as a result of combustion of a charge providing power to said cutter member during said compression stroke of the engine, and means to supply combustible charges into said combustion chamber in timed relation to relative movement between said cylinder member and said piston member including a fuel tank mounted in fixed position on said frame and a flexible fuel supply tube connected to said engine.

22. A reciprocating cutting machine comprising a frame, a cutter member mounted on said frame for reciprocating movement relative thereto, an internal combustion reaction engine for reciprocating said cutter including a cylinder member and a piston member in said cylinder member cooperating to define a power cylinder including a combustion chamber, mounting means on said frame supporting said cylinder member for free reciprocating movement along its axis, means on one of said members connected directly to said cutter providing for reciprocating movement of said cutter along with said one member, the other said member being supported for free movement relative to said one member providing a solid reaction mass having substantial inertial resistance to movement thereof in response to combustion of a charge in said power cylinder, biasing means acting on said members in a direction to reduce the volume of said power cylinder in the nature of a compression stroke, said biasing means being of sufficient strength to absorb and return substantially all energy transmitted thereto as a result of combustion of a charge providing power to said cutter member during said compression stroke, means to supply combustible charges into said combustion chamber in timed relation to relative movement between said cylinder member and said piston member including a fuel tank fixed on said frame, and resiliently yieldable buffer means mounted on said frame in position for engagement with said other member providing the reaction mass to define the limits of free movement thereof relative to said frame.

23. A reciprocating cutting machine comprising a frame, a cutter member mounted on said frame for reciprocating movement relative thereto, an internal combustion reaction engine for reciprocating said cutter including a cylinder member and a piston member in said cylinder member cooperating therewith to define a power cylinder including a combustion chamber, mounting means on said frame supporting said cylinder member for reciprocating movement along its axis, means on one of said members connected directly to said cutter providing for reciprocating movement of said cutter along with said one member, the other said member being supported for free movement relative to said frame relative to said one member providing a solid reaction mass having substantial inertial resistance to movement in response to combustion of a charge in said power cylinder, biasing means acting on said members in a direction to reduce the volume of said power cylinder in the nature of a compression stroke, said biasing means being of sufficient strength to absorb and return substantially all energy transmitted thereto as a result of combustion of a charge, means to supply combustible charges into said combustion chamber in timed relation to relative movement between said cylinder member and said piston member, and resiliently yieldable buffer means on said frame engageable with opposite ends of said cylinder member to define the limits of free movement thereof relative to said frame.

24. A mowing machine of the character described comprising a frame, ground engaging means on said frame providing for movement thereof over the ground in predetermined spaced relation to the ground surface, a handle connected to said frame and extending upwardly therefrom providing means for moving said frame, a cutter on said frame including a stationary cutter bar fixed to said frame and a movable cutter bar mounted on said stationary bar, means confining the relative movement between said bars to provide for cutting action thereof, an internal combustion reaction drive for reciprocating said movable cutter bar including a cylinder member, means mounting said cylinder member on said frame with the axis thereof extending parallel to the length of said cutter bars, means connecting said movable cutter bar directly to said cylinder member for conjoint movement thereof, a piston member mounted for free reciprocating movement in said cylinder member providing a solid reaction mass having substantial inertial resistance to movement in response to combustion of a charge in said engine, biasing means acting on said piston member and said cylinder member in a direction providing a compression stroke, said biasing means being of sufficient strength to absorb and return substantially all energy transmitted thereto resulting from combustion of a charge in said engine to reverse the relative movement of said members while preventing impact between said members under normal operating conditions, and means to supply combustible charges to said engine in timed relation to relative movement between said cylinder member and said piston member.

25. A mowing machine of the character described comprising a frame, ground engaging means on said frame providing for movement thereof over the ground in predetermined spaced relation to the ground surface, a cutter on said frame including an elongated stationary cutter bar fixed to said frame and a movable cutter bar mounted in contact with said stationary bar, cooperating cutting teeth on said bars, means confining the relative movement between said bars to provide for overlapping cutting action by said teeth, an internal combustion reaction drive for reciprocating said movable cutter bar including a free piston engine having a cylinder member, means mounting said cylinder member on said frame for free movement relative to said frame in a direction axially of said cylinder member, means connecting said movable cutter bar directly to said cylinder member for conjoint movement thereof, a free piston member mounted in said cylinder member providing a solid reaction mass having substantial inertial resistance to movement in response to combustion of a charge in said engine, means to supply combustible charges to said engine in timed relation to relative movement between said cylinder member and said piston member, ignition means arranged to ignite charges in said combustion chamber, and biasing means acting between said piston and cylinder members in opposition to relative movement thereof in response to combustion of a charge in said engine.

26. A mowing machine of the character described comprising a frame, ground engaging means on said frame providing for movement thereof over the ground in predetermined spaced relation to the ground surface, a handle, vibration damping means connecting said handle to said frame extending upwardly therefrom to provide means for moving said frame, a cutter on said frame including a stationary cutter bar fixed to said frame and a movable cutter bar mounted on said stationary bar, means confining the relative movement between said bars to provide for cutting action thereof, an internal combustion reaction drive for reciprocating said movable cutter bar including a cylinder member, means mounting said cylinder member on said frame with the axis thereof extending parallel to the length of said cutter bars, means connecting said movable cutter bar directly to said cylinder member for conjoint movement thereof, a piston member mounted for free reciprocating movement in said cylinder member providing a solid reaction mass having substantial inertial resistance to movement in response to combustion of a charge in said engine, biasing means acting on said piston member and said cylinder member in a direction providing a compression stroke, said biasing means being of sufficient strength to absorb and return substantially all energy transmitted thereto resulting from combustion of a charge in said engine to reverse the relative movement of said members while preventing impact between said members under normal operating conditions, and means to supply combustible charges to said engine in timed relation to relative movement between said cylinder member and said piston member.

27. A mowing machine of the character described comprising a frame, ground engaging wheels on said frame, a handle connected to said frame and extending upwardly therefrom providing means for moving said frame over the ground, a cutter on said frame including a stationary cutter bar fixed to said frame and a movable cutter bar mounted on said stationary bar, means confining the relative movement between said bars to provide for cutting action thereof, an internal combustion reaction engine for reciprocating said movable cutter bar including a cylinder member having a closed end and a piston member in said cylinder member cooperating with said closed end thereof to define a power cylinder including a combustion chamber, mounting means on said frame supporting said cylinder member for reciprocating movement along its axis, means on one of said members connected directly to said cutter bar providing for reciprocating movement of said movable cutter bar along with said one member, means supporting the other said member for limited free movement with respect to said frame relative to said one member providing a solid reaction mass having substantial inertial resistance to movement in response to combustion of a charge in said power cylinder, resiliently yieldable buffer means mounted on said frame in position for engagement with said cylinder member to define the limits of free movement thereof relative to said frame, biasing means acting on said members in a direction to reduce the volume of said power cylinder providing for relative movement therebetween in the nature of a compression stroke, said biasing means being of sufficient strength to absorb and return substantially all energy transmitted thereto as a result of combustion of a charge, and means to supply combustible charges into said combustion chamber in timed relation to relative movement between said cylinder member and said piston member.

28. A direct acting fluid compressor-internal combustion engine unit comprising a cylinder member having a closed end, a piston member in said cylinder member cooperating with said closed end thereof to define a power cylinder including a combustion chamber, fluid compressor means including a cylinder formed in said cylinder member and a piston reciprocably received therein, means providing a drive connection between said piston member and said piston, means supporting said cylinder member for free movement in space relative to said piston member in a direction axially of said cylinder member providing a solid reaction mass having an inertial resistance to movement in response to combustion of a charge in said cylinder, yieldable biasing means acting on both said members in a direction to reduce the volume of said power cylinder providing for relative movement therebetween in the nature of a compression stroke, said biasing means being of sufficient strength to absorb and return substantially all energy imparted thereto from said piston member and/or said cylinder member during each power stroke movement thereof providing an effective power delivery to said compressor during the compression stroke of said engine, means connected to supply a combustible charge into said power cylinder in timed relation to a relative movement between said cylinder member and said piston member, ignition means arranged to ignite charges in said combustion chamber and valving means connected into said compressor cylinder for controlling the inflow thereto and delivery of fluid therefrom providing an effective delivery of fluid under pressure from said compressor.

References Cited in the file of this patent

UNITED STATES PATENTS

| | | |
|---|---|---|
| 1,087,465 | Ryder | Feb. 17, 1914 |
| 1,187,977 | Demers | June 20, 1916 |
| 2,101,608 | Boddinghouse | Dec. 7, 1937 |
| 2,223,095 | Charles | Nov. 26, 1940 |
| 2,474,131 | Verderber et al. | June 21, 1949 |
| 2,497,781 | Logashkin | Feb. 14, 1950 |
| 2,628,599 | Wilson et al. | Feb. 17, 1953 |
| 2,638,080 | Pielstick | May 12, 1953 |
| 2,721,435 | Blair | Oct. 25, 1955 |